(12) United States Patent  
Dray

(10) Patent No.: US 7,314,368 B2
(45) Date of Patent: *Jan. 1, 2008

(54) DUAL-CYLINDER INJECTION MOLDING APPARATUS

(76) Inventor: Robert Franklin Dray, 4727 Papaya Park, Destin, FL (US) 32541

( * ) Notice: Subject to any disclaimer, the term of this patent is extended or adjusted under 35 U.S.C. 154(b) by 62 days.

This patent is subject to a terminal disclaimer.

(21) Appl. No.: 10/852,585

(22) Filed: May 24, 2004

(65) Prior Publication Data

US 2005/0013896 A1 Jan. 20, 2005

Related U.S. Application Data

(63) Continuation of application No. 10/221,826, filed as application No. PCT/US01/08211 on Mar. 15, 2001, now Pat. No. 6,739,862.

(60) Provisional application No. 60/189,690, filed on Mar. 15, 2000.

(51) Int. Cl.
*B29C 45/02* (2006.01)
(52) U.S. Cl. .................. 425/557; 425/560; 425/565
(58) Field of Classification Search ........... 425/560, 425/557, 574, 562, 563, 564, 565
See application file for complete search history.

(56) References Cited

U.S. PATENT DOCUMENTS

| 2,359,840 | A | 10/1944 | Goessling .................. 425/565 |
| 2,505,540 | A | 4/1950 | Goldhard |
| 4,067,673 | A | 1/1978 | Hendry |
| 4,358,033 | A | 11/1982 | Dykehouse .................. 222/559 |
| 4,362,496 | A | 12/1982 | Uhlig |
| 4,722,679 | A | 2/1988 | Farrell .......................... 425/559 |

(Continued)

FOREIGN PATENT DOCUMENTS

DE 4331207 A 3/1995

(Continued)

OTHER PUBLICATIONS

EP Patent Application No. 01922391.6; "Communication pursuant to Article 96(2) EPC" from the European Patent Office, dated Mar. 19, 2004; Applicant, Robert F. Dray.

(Continued)

*Primary Examiner*—Tim Heitbrink
(74) *Attorney, Agent, or Firm*—Mark D. Perdue; Storm LLP

(57) ABSTRACT

An injection molding apparatus for injecting resin into a mold comprises an injection cylinder in fluid communication with the mold, wherein movement of a piston relative to the cylinder injects a selected quantity of resin into the mold. A plasticizing unit includes a flighted screw rotating in a heated containment barrel for plasticizing resin. The plasticizing unit is in fluid communication with the injection cylinder for supplying the injection cylinder with plasticized resin. A valve is provided for selectively placing the injection cylinder in fluid communication with the mold and placing the plasticizing unit in fluid communication with the injection cylinder, wherein the valve exerts pressure on resin in the mold independently of the injection cylinder or plasticizing unit. The valve is actuated by relative movement between the mold and one of the injection cylinder and the plasticizing unit.

17 Claims, 9 Drawing Sheets

U.S. PATENT DOCUMENTS

| | | | |
|---|---|---|---|
| 4,749,536 A | 6/1988 | Farrell | |
| 5,071,341 A | 12/1991 | Poehlsen | |
| 5,123,833 A | 6/1992 | Parker | |
| 5,281,384 A | 1/1994 | Banks | |
| 5,380,187 A | 1/1995 | Fujikawa | |
| 5,577,839 A | 11/1996 | Brams et al. | |
| 5,925,295 A | 7/1999 | Nakamura et al. | |
| 6,030,203 A | 2/2000 | Kuroda | |
| 6,739,862 B2 * | 5/2004 | Dray | 425/557 |

FOREIGN PATENT DOCUMENTS

| | | | |
|---|---|---|---|
| DE | 19632315 C | 5/1998 | |
| JP | 60 120024 A | 6/1985 | |

OTHER PUBLICATIONS

EP Patent Application No. 01922391.6; Applicant Robert F. Dray's response dated Aug. 9, 2004 to the European Patent Office regarding Examiner's report dated Mar. 19, 2004.

EP Patent Application No. 01922391.6; "Decision to refuse a European Patent Application" from the European Patent Office, dated Aug. 24, 2006; Applicant, Robert F. Dray.

EP Patent Application No. 01922391.6; Applicant Robert F. Dray's response dated Oct. 20, 2006 (filing of an Appeal) to the European Patent Office regarding Decision dated Aug. 24, 2006.

EP Patent Application No. 01922391.6; "Communication under Rule 51(4) EPC" from the European Patent Office, dated Feb. 20, 2007, regarding decision to grant a European patent; Applicant, Robert F. Dray.

* cited by examiner

DUAL-CYLINDER INJECTION MOLDING APPARATUS

This is a continuation of Ser. No. 10/221,826, filed Sep. 16, 2002, now U.S. Pat. No. 6,739,862, which is the national stage of PCT/US01/0821 filed Mar. 15, 2001 and claims the benefit of U.S. Provisional Application No. 60/189,690 filed Mar. 15, 2000.

TECHNICAL FIELD

The present invention relates to improvements in injection molding apparatus. More particularly, the present invention relates to an injection molding apparatus that employs a flighted screw turning and reciprocating in a containment barrel to plasticize polymer for injection and a separate piston and cylinder arrangement to inject the polymer into the mold.

BACKGROUND ART

Injection molding—the process of injecting a quantity, or shot, of molten plastic or resin into a mold—is today one of the world's dominant forms of plastic article manufacture. In this process, resin is melted, mixed, and made flowable by a combination of the application of heat and kinetic energy, usually through the use of a flighted screw that rotates and reciprocates within a heated containment barrel. A mold is designed and manufactured with a cavity configuration that allows for the specific part or parts to be molded. The mold is mounted in a mold clamp and is in fluid communication with the containment barrel.

After the rotating screw and applied heat have plasticized the resin, the screw is moved forward to inject the shot of plastic from the accumulation volume into the mold. The operation known as pack-and-hold (exerting additional pressure on the resin in the mold) is accomplished by further forward movement of the screw.

Before the advent of the heated screw, the plastic or polymer simply was contained in a cylinder, which was heated by conduction. When the polymer was melted it was conveyed into an injection cylinder where a piston moved forward to inject the plastic into the mold. The piston performs the pack-and-hold operation.

The plasticizing action of the screw dramatically increased the speed of the process. Nevertheless, use of the rotating and reciprocating screw imposes several limitations on the process. First a non-return valve is included on the end of the screw to permit plastic to flow past the screw during plasticizing but not during injection. Accurate shot size is a function of the accuracy of the non-return valve. Also, the size of the shot is determined by the inner diameter of the barrel and the stroke length of the screw; thus, the rate of recovery (backward movement of the screw to pre-injection position and filling of the accumulation volume downstream of the screw) is a function of the shot size. Screw diameter should be determined only by the recovery requirements and the cylinder diameter by the force required to fill the mold. Shot size thus is a screw and barrel length design feature, and variation in the shot size without corresponding change of screw and barrel length can cause reductions in efficiency of the plasticizing process. Sometimes shut-off valves are used to halt flow between barrel and mold, and are required if the screw is to recover when the mold is open.

There are also known injection molding apparatus that employ the screw/heated barrel arrangement (without the ability to reciprocate) to fill an accumulator, which in turn provides pressure to inject shots into the mold. The accumulator also performs the pack-and-hold functions. Nevertheless, the screw must provide constant temperature and pressure to the accumulator or shot density and weight will vary. Furthermore, due to the relatively large volume of the accumulator and associated tubing and valving that are unswept by a piston, color chances are problematic, requiring lengthy purging operations and increasing the likelihood of scrap parts. The three-way valve required for this type of machine directs the flow from the screw to the accumulator and from the accumulator to the mold has been a common source of problems. If the valve fails to operate properly, high injection pressures can be directed to and exerted upon the screw, destroying the thrust assembly of the screw. Short (small volume) shots and leakage are also common problems.

A need exists, therefore, for an injection molding apparatus that avoids the drawbacks of both reciprocating screw and accumulator systems, while providing the advantages and benefits of both.

DISCLOSURE OF THE INVENTION

It is a general object of the present invention to provide an injection molding apparatus of the variety having separate plasticizing and injection units. This and other objects of the present invention are achieved with an injection cylinder in fluid communication with a mold, wherein movement of a piston within the cylinder injects a selected quantity of resin into the mold. A plasticizing unit includes a flighted screw rotating in a heated containment barrel for plasticizing resin. The plasticizing unit is in fluid communication with the injection cylinder for supplying the injection cylinder with plasticized resin. A valving means is provided for selectively placing the injection cylinder in fluid communication with the mold and placing the plasticizing unit in fluid communication with the injection cylinder, wherein the valving means is actuated by relative movement between the mold and one of the injection cylinder and the plasticizing unit. The valving means is also capable of exerting pressure on resin in the mold independently of the injection cylinder or plasticizing unit.

The valving means may comprise a nozzle extending from either the plasticizing unit or the injection cylinder. The nozzle is received in a bore in a portion of the mold and reciprocates or moves within the bore to accomplish the valving function and to exert pressure on the resin in the mold independently of the plasticizing unit or the injection cylinder.

MODES FOR CARRYING OUT THE INVENTION

Figure 1:
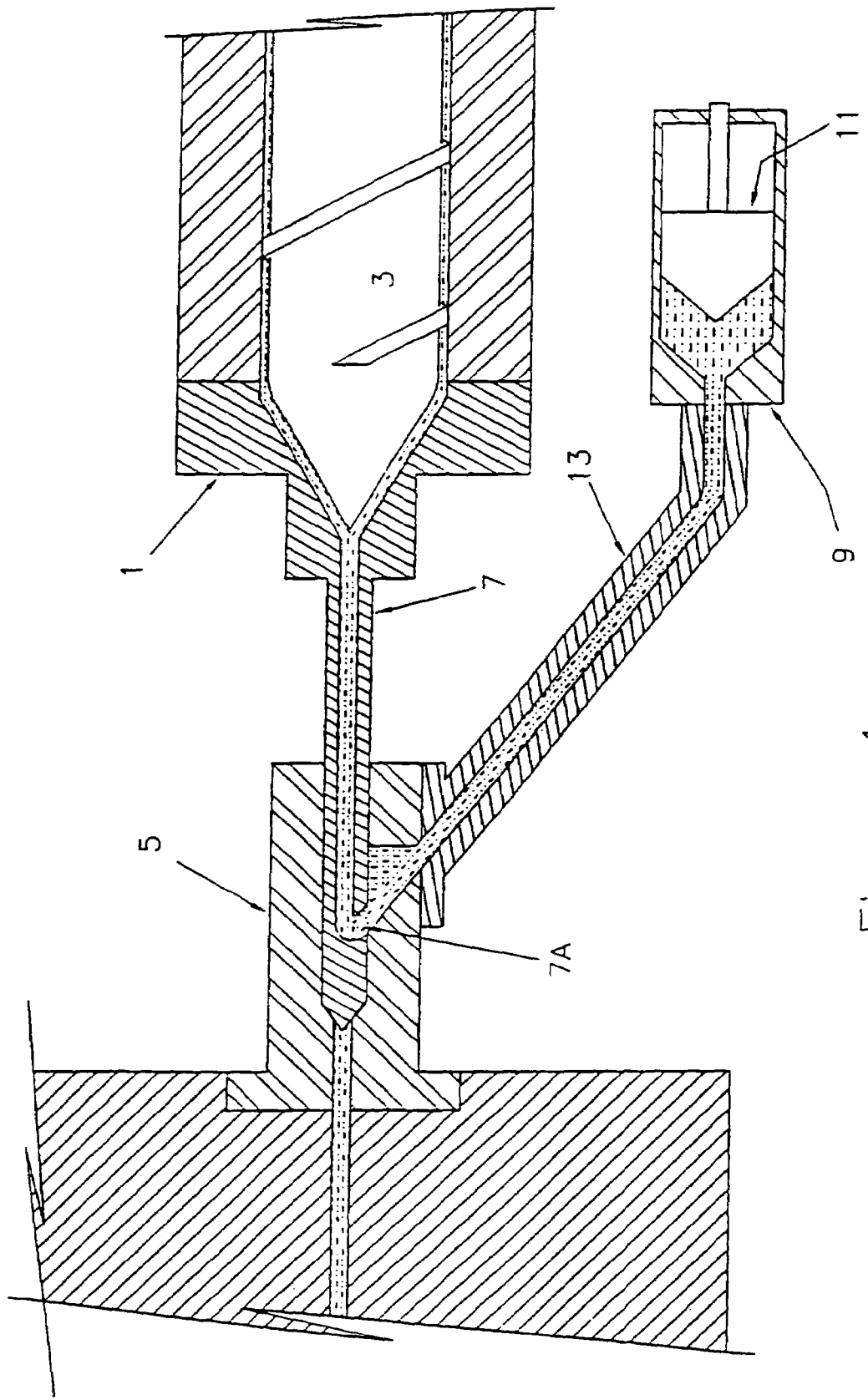
FIG. 1 is a partial section view of one embodiment of the present invention in a "no-flow" or pack-and-hold position.
Figure 2:
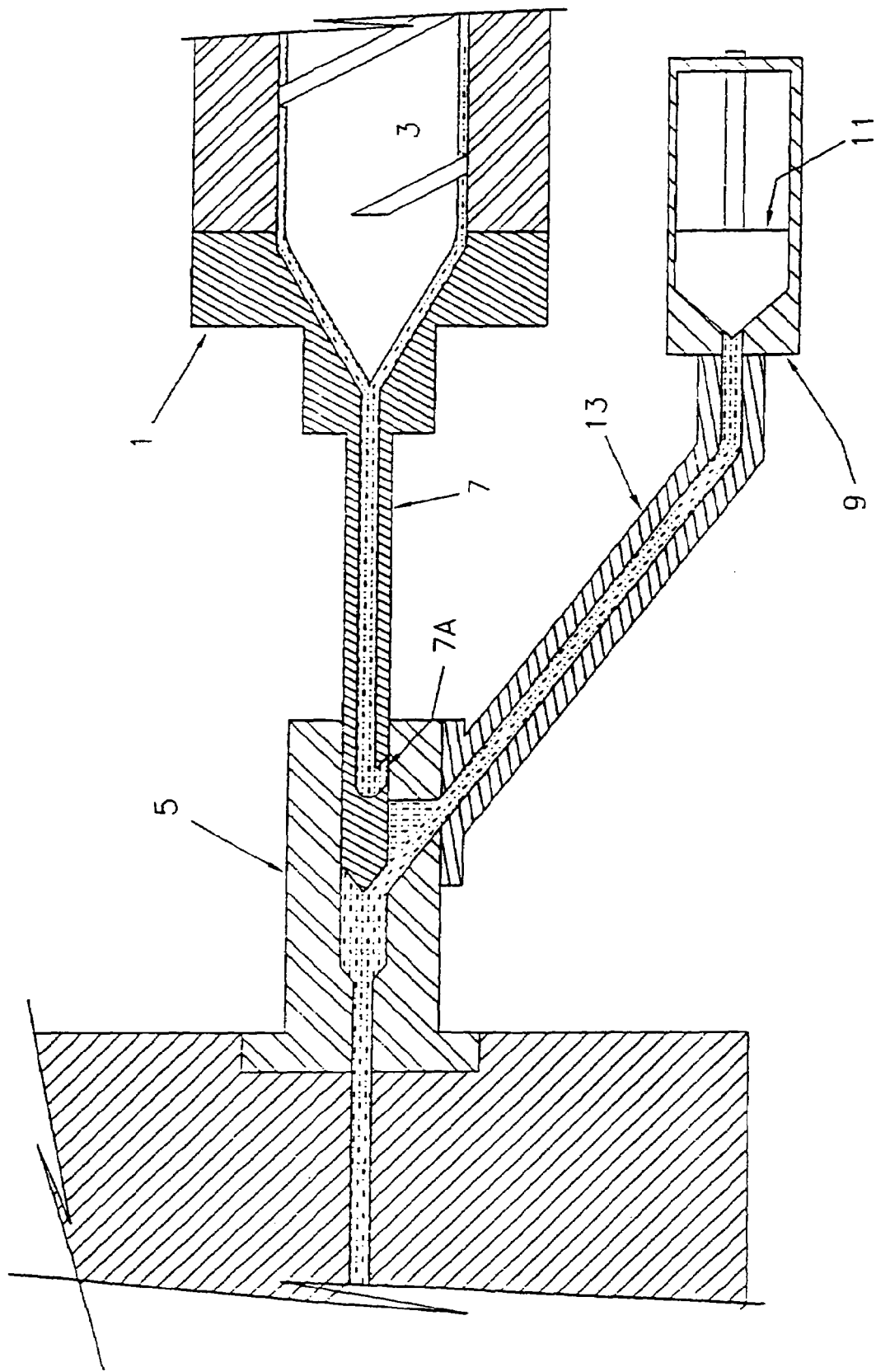
FIG. 2 is a partial section view of the embodiment of FIG. 1 in a flowing or injection position.

Turning now to the figures, and particularly to FIGS. 1 and 2, one embodiment of the invention according to the present invention is shown. An injection unit 1 is conventional in configuration and includes a flighted screw 3 turning in a heated containment barrel to melt and plasticize resin for injection. According to the present invention, plasticizing screw 3 is fixed and does not reciprocate and no accumulation volume is defined in the barrel.

A nozzle 7 extends from injection unit 1 into a bore in a sprue bushing 5 portion of a mold assembly. A central passage in nozzle 7 selectively is in fluid communication with an injection cylinder 9, which contains a reciprocating piston 11. A tube or pipe 13 connects an aperture in sprue bushing 5 that can be aligned with a port 7A in nozzle 7.

FIG. 1 depicts the apparatus in a pack-and-hold position in which the tip of nozzle & is deep in the bore in sprue bushing 5 and increased pressure is exerted on the resin in the mold by the nozzle. In this position, fluid communication between injection cylinder 9 and the mold is blocked, but screw 3 can turn and fill cylinder 9 with resin for another shot.

FIG. 2 depicts the apparatus of FIG. 1 in an inject position in which nozzle 7 is retracted, permitting fluid communication between cylinder 9 and the mold through the passage in tube 13 and sprue bushing 5, and thus injection of resin. Relative movement between injection unit 9 and sprue bushing 5 is induced by the electro-mechanical or hydraulic sled arrangement conventionally provided with injection unit and mold assemblies. This sled arrangement can be easily adapted to control injection and pack-and-hold operations through the use of limit switches and the like. Thus, the nozzle functions as a valve to selectively establish fluid communication between the injection cylinder and the mold (and between the injection cylinder and the plasticizing unit).

In the following FIGS. 3–9, structure similar to that in FIGS. 1 and 2 is numbered similarly, but with the addition of 100, 200, or 300 (e.g. plasticizing cylinderi is plasticizing cylinder 101, 201, 301; screw 3 is screw 103, 203, 303; mold 5 is mold 105, 205, 305; nozzle 7 is nozzle 107, 207, 307; ports 7A are ports 107A, 207A; injection cylinder 9 is injection cylinder 109, 209, 309; piston 11 is piston 111, 211, 311; pipe or conduit 13 is conduit 113, 213; recess 115 is recess 215; aperture 117 is aperture 217; passage 19 is passage 119, 219; channel 121 is channel 221).

Figure 3:
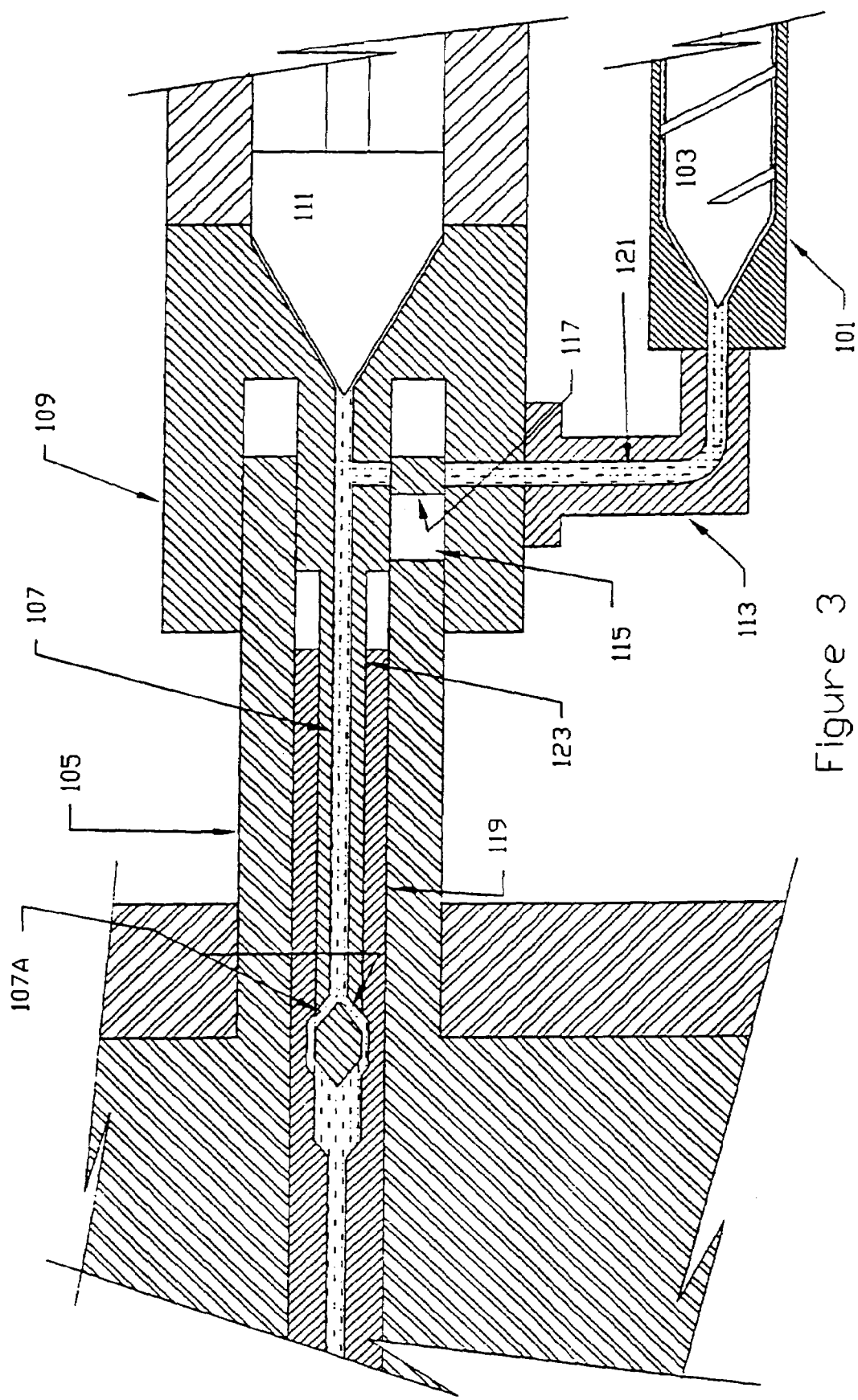
FIGS. 3, 4, and 5 are partial section views of another embodiment of the present invention.
Figure 4:
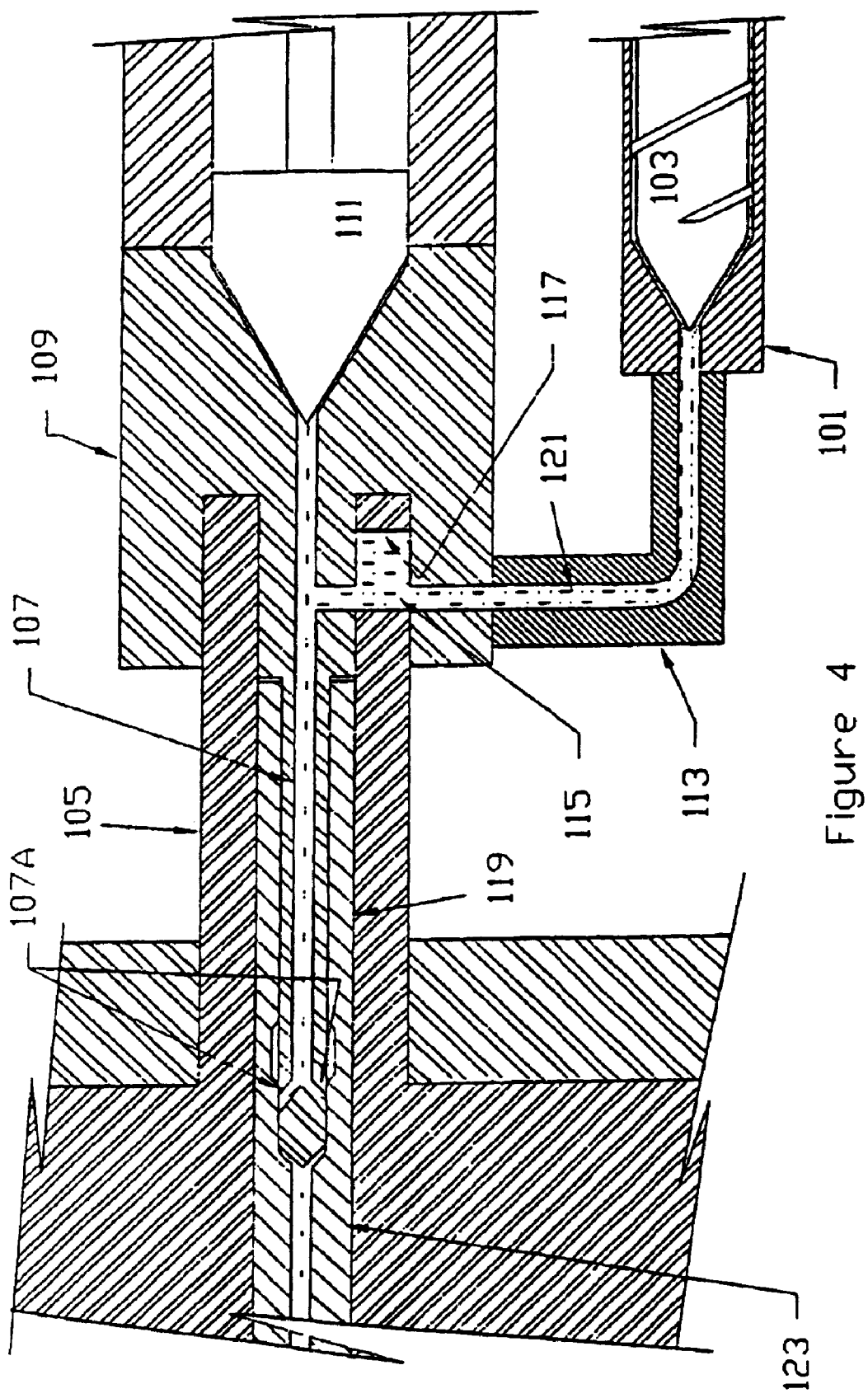
Figure 5:
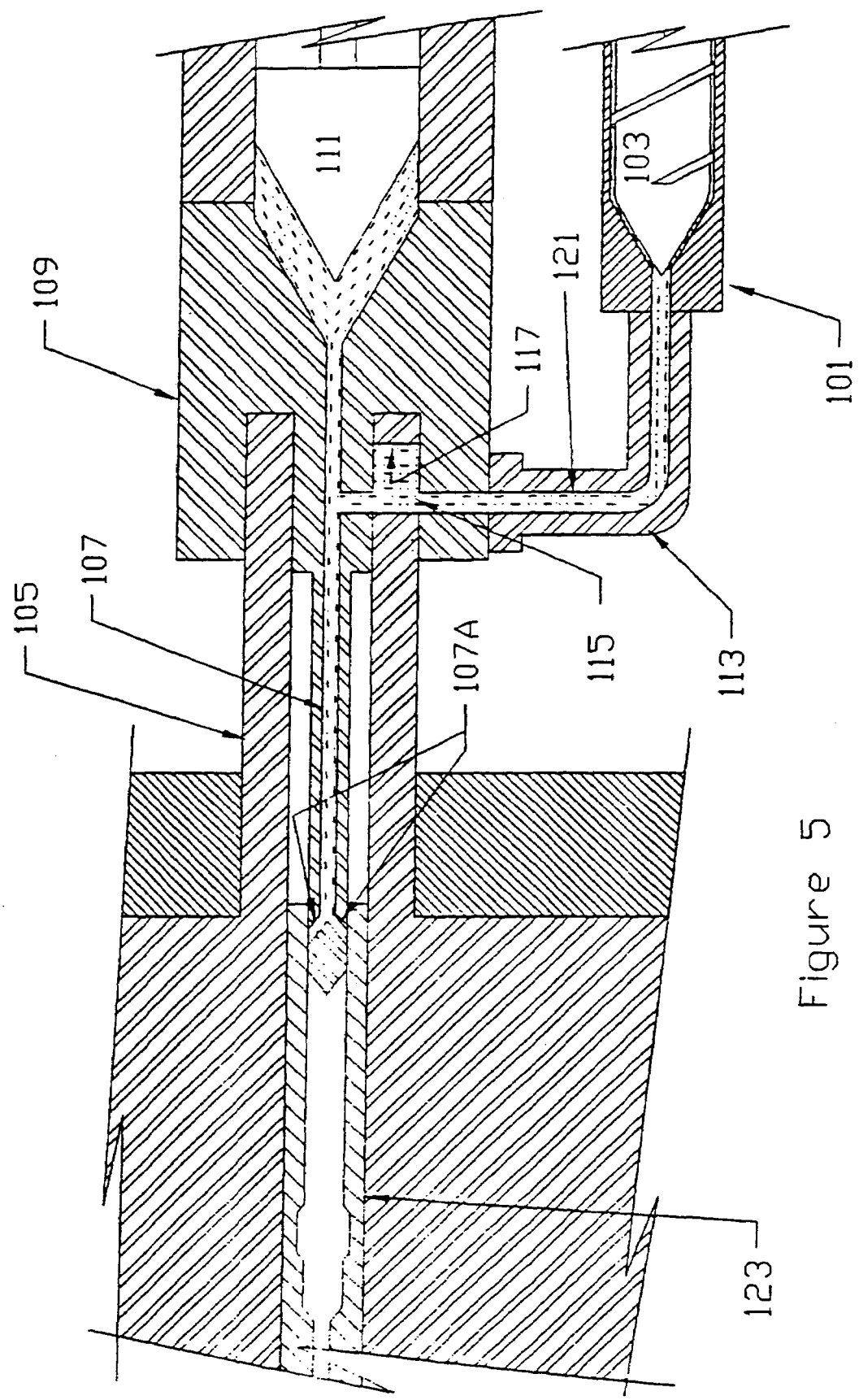

FIGS. 3–5 are partial section views of another embodiment of the present invention. In this embodiment, injection cylinder 109 is coaxially aligned with sprue bushing 105, while the plasticizing unit (barrel 101 and screw 103) is offset. nozzle 107 extends from cylinder 109 into a bore in sprue bushing 105 and a corresponding bore in a sprue bar 123 disposed concentrically within the bore of sprue bushing 105.

Sprue bar 123 is part of a multi-part mold (as opposed to conventional molds and is not a necessary part of the invention except where the invention is used with multi-part molds. Where a multi-part mold is not used, nozzle 107 is received directly in a bore in sprue bushing 105.

In this embodiment, plasticizing screw 103 and barrel 101 are in fluid communication with cylinder 109 through conduit 113 and corresponding passage 121. An annular recess 115 is dimensioned to receive a portion of sprue bushing 105 in sliding relation. An aperture 117 in the wall of sprue bushing 105 selectively obstructs the passage in fluid communication between screw and barrel and the outlet of injection cylinder 109. Relative movement between the cylinder and mold aligns passage 121 with aperture 117 so that cylinder 109 can be filled with plasticized resin from screw and barrel 101, 103. Relative movement also causes nozzle 107 to move within bore 119 into alignment with an enlarged-diameter portion of the bore that permits resin to flow through ports 107A and into the mold during the injection step (illustrated in FIG. 5). Obstruction of ports 107A is accomplished by moving them (and nozzle 107) forward of or behind the enlarged-diameter portion. The relative movement again is caused by the sled arrangement provided with most injection molding machines and the relative movement actuates the valving function.

FIG. 4 depicts the embodiment of FIG. 3 in a pack-and-hold position in which the end of nozzle 107 extends forward beyond the enlarged-diameter portion of bore 119 and thereby exerts additional pressure on the resin in the mold independent of the injection cylinder, which is able to reverse direction and fill with plasticized resin from plasticizing cylinder and screw 101, 103 because of the alignment between aperture 117 and passage 121.

FIG. 5 depicts the embodiment of FIGS. 3 and 4 in a decompression position in which the end of nozzle 107 and ports 107A are retracted beyond the enlarged-diameter portion of bore 119, permitting decompression of the mold. In this position, ports 107A are obstructed so that resin cannot flow into the mold.

Figure 6:
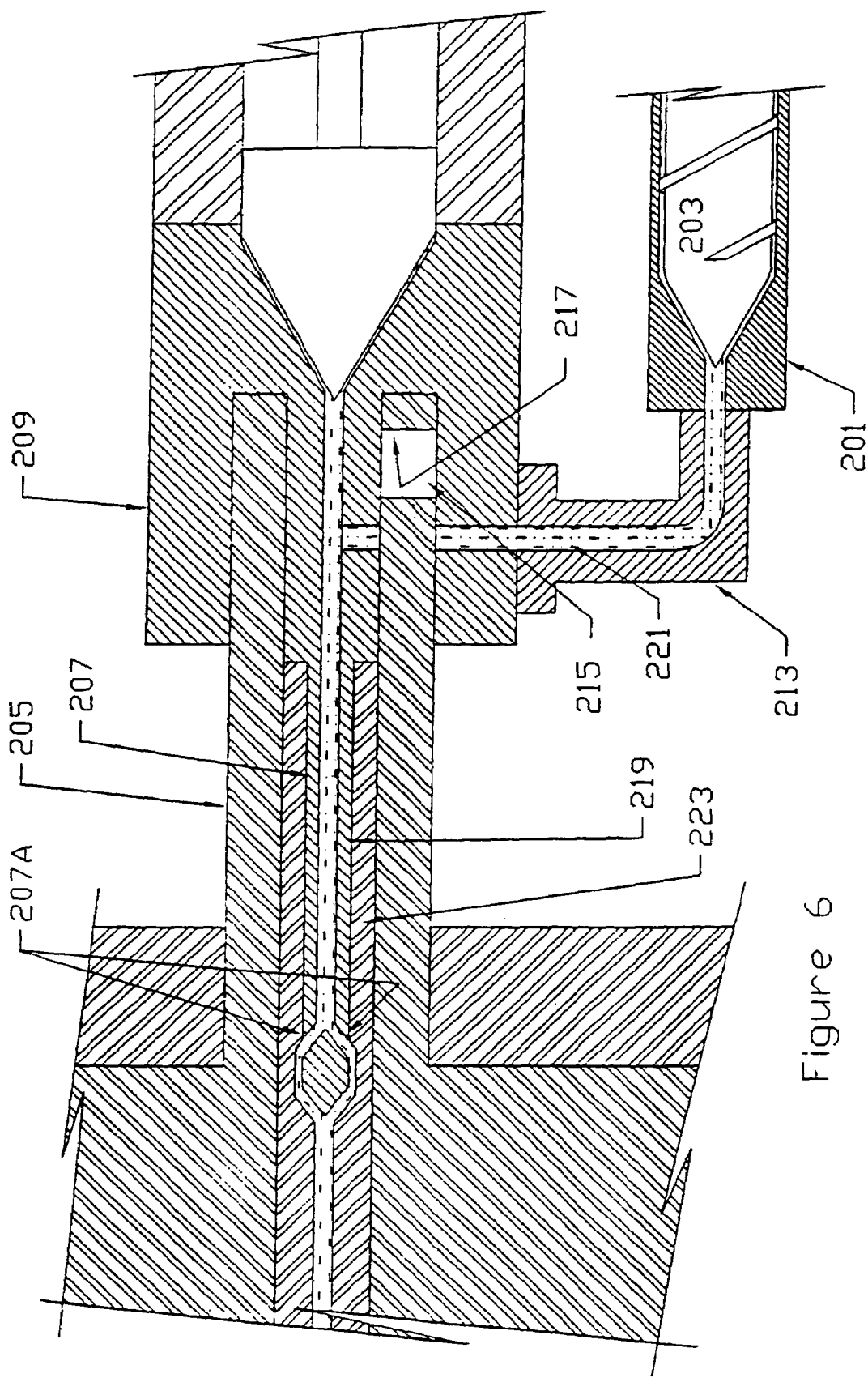
FIGS. 6 and 7 are partial section views of another embodiment of the present invention.
Figure 7:
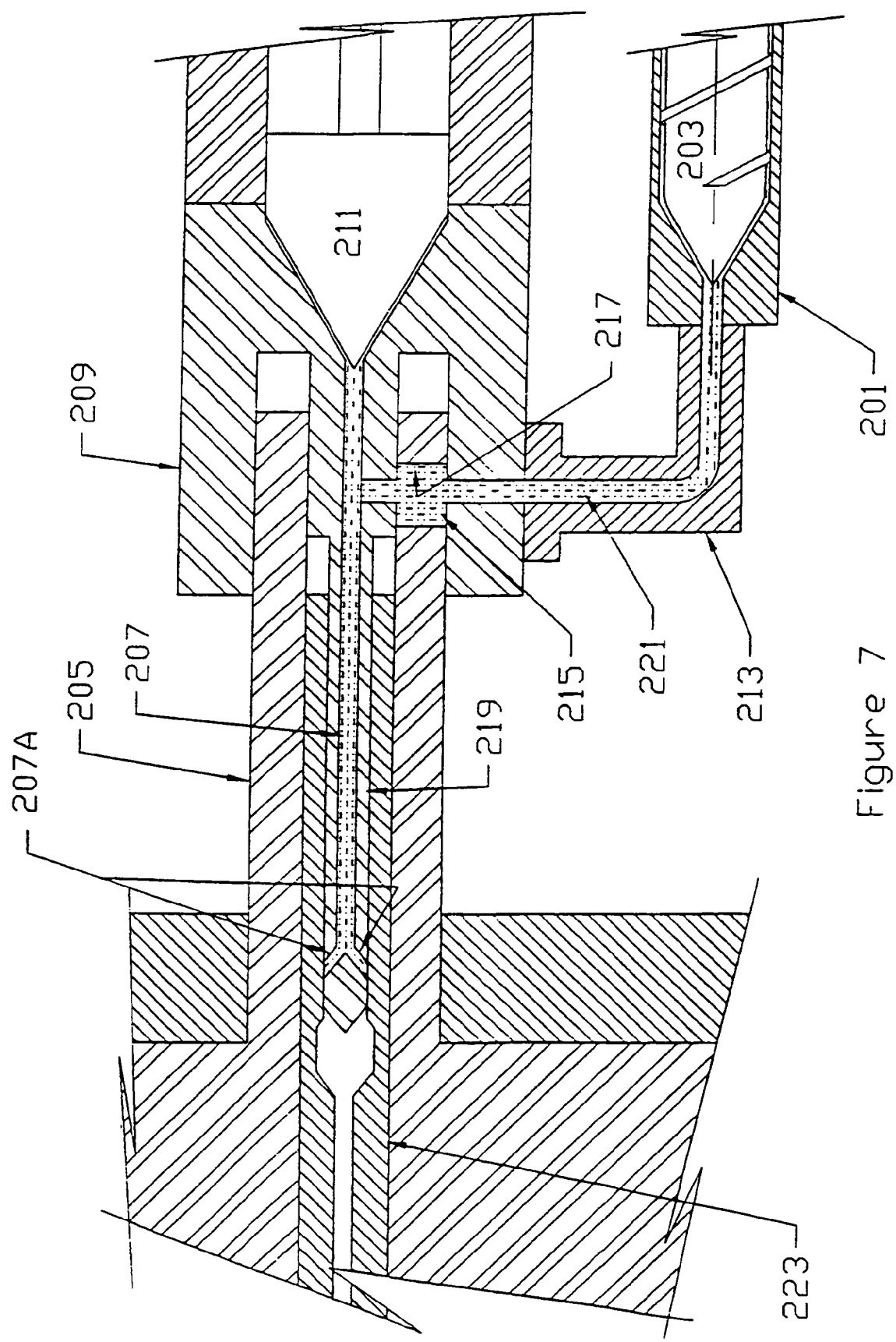

FIGS. 6 and 7 illustrate another embodiment of the present invention in which no space is provided forward of the enlarged-diameter portion of bore 219. In other words, the end of nozzle 207 and ports 207A cannot move past the enlarged-diameter portion of passage 219. This embodiment thus is not adapted to provide pack-and-hold operations, but only injection (FIG. 6) and decompression and recovery (FIG. 7) operations. The amount of relative movement between cylinder 209 and the mold is less than in the other embodiments and has application in high-speed processes. This embodiment also illustrates a sprue bar 223. which is not part of the invention, but a feature of a multi-part mold, as set forth above.

Figure 8:
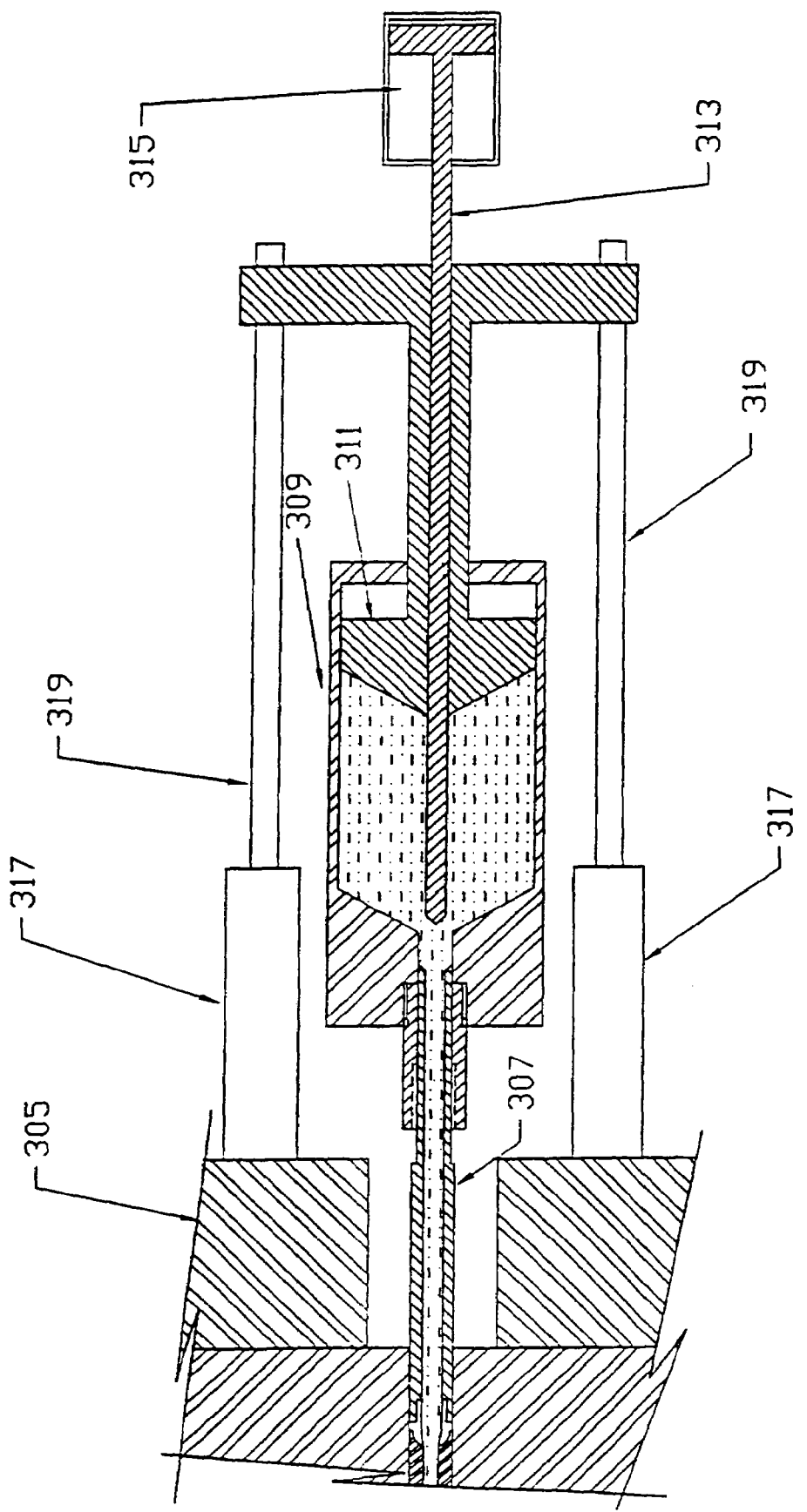
FIGS. 8 and 9 are partial section views of another embodiment of the present invention that is intended to be an original equipment manufacture (OEM) design rather than a retrofit to existing equipment.
Figure 9:
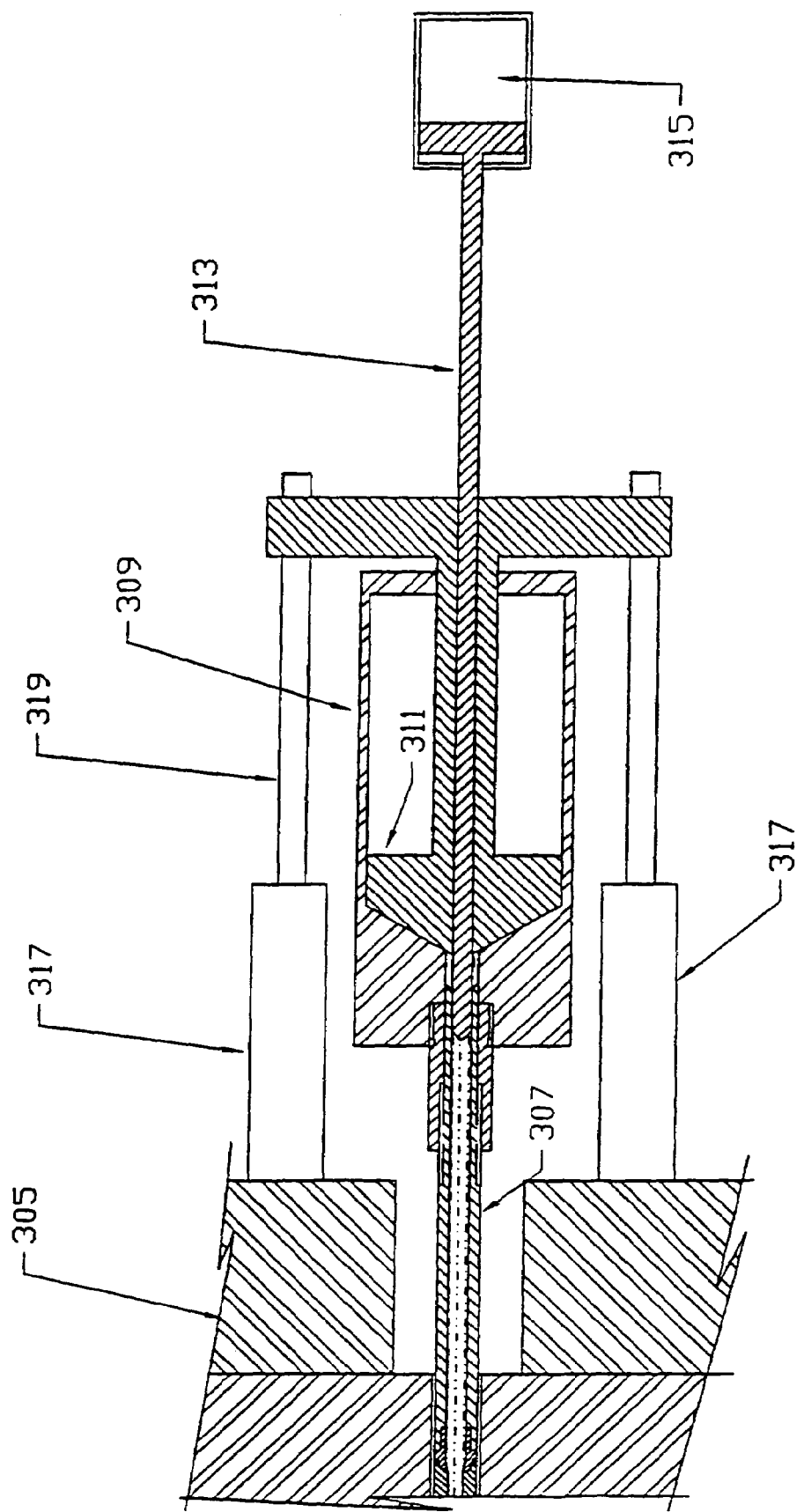

FIGS. 8 and 9 are longitudinal, partial section views of an embodiment of the present invention adapted for original equipment manufacture (OEM), as opposed to retrofitting of existing injection molding machines. In this embodiment, a plasticizing screw (not shown, but identical to those described above) is in fluid communication with an injection cylinder 309, which contains a piston 311 to inject plasticized resin into mold 305. According to this embodiment of the invention, a nozzle 307 extends from cylinder 309 and into a recess in mold 105 (both the mold proper and the platen are referred to generally as 105) and into fluid communication with the interior of the mold. Hydraulic cylinders and rods 317, 319 move cylinder 309 and nozzle 307 into and out of contact with mold 305.

A piston 311 within cylinder 315 moves forward to inject plasticized resin into the mold. A rod 313, actuated by piston and cylinder 315, extends through piston 311 and selectively into the bore in nozzle 307. Piston and cylinder arrangement 315 reciprocates rod into and out of the bore in nozzle 307. When rod 313 is within the bore of nozzle 307 (as shown in FIG. 9), flow through nozzle is obstructed, permitting cylinder 309 to be filled with plasticized resin from the plasticizing cylinder and screw. Furthermore, rod 313 acts as a piston in its own right, exerting pack-and-hold pressure on resin in the mold and mold runners. This pack-and-hold pressure can be exerted independent of piston and cylinder 309, 311 and independent of the operation of the plasticizing screw.

The present invention has a number of advantages. A principal advantage is that injection, pack-and-hold, and decompression operations are not dependent upon pressure exerted by the plasticizing screw or injection cylinder. All embodiments provide a separate piston to exert these pressures on resin in the mold. This permits the plasticizing screw to rotate and plasticize at all times, increasing melt uniformity and avoiding transients in temperatures and mixing that can cause irregularities and defects in the resulting molded products. Also, because the injection cylinder performs only the injection function, its design can be optimized and injection controlled more precisely. Pack-and-hold and decompression operations also can be controlled more precisely.

The injection cylinder pressure requirements are far less than in conventional arrangements (normally in the range of 2,000–2,500 psi) because high pressures are required only during the final filling of the mold (pack). Mold fill occurs with the present invention at less than 1,000 psi. Thus, the need for high-pressure (up to 30,000 psi) valve and barrel designs is eliminated because pack-and-hold is accomplished with a separate and smaller-diameter piston and cylinder arrangement.

The invention is described with reference to preferred embodiments thereof. It is thus not limited, but is susceptible to variation and modification without departing from the scope and spirit of the invention.

The invention claimed is:

1. An injection molding apparatus for injecting resin into a mold, the apparatus comprising:
    an injection cylinder in fluid communication with the mold, wherein movement of a piston within the cylinder injects a selected quantity of resin into the mold;
    a plasticizing unit including a flighted screw rotating in a heated containment barrel for plasticizing resin the plasticizing unit in selective fluid communication with the injection cylinder for supplying the injection cylinder with plasticized resin; and
    a valve assembly coupled between the mold and the injection cylinder and plasticizing unit, the valve for selectively placing the injection cylinder in fluid communication with the mold and for selectively placing the plasticizing unit in fluid communication with the injection cylinder, wherein the valve assembly is actuated by relative movement between the mold and one of the injection cylinder and the plasticizing unit.

2. The injection molding apparatus according to claim 1, wherein the valve assembly includes a piston that selectively exerts pressure on the resin in the mold independently of the plasticizing unit and the injection cylinder.

3. The injection molding apparatus according to claim 1, wherein the injection cylinder is coaxially aligned with the mold.

4. The injection molding apparatus according to claim 1, wherein the valve assembly selectively places the plasticizing unit in fluid communication with the injection cylinder.

5. The injection molding apparatus according to claim 1, wherein the valve assembly comprises a nozzle extending from one of the injection cylinder and the plasticizing unit, the nozzle being received for reciprocation in a bore formed in a portion of the mold, wherein the position of the nozzle within the bore selectively establishes fluid communication between the injection cylinder and the mold.

6. The injection molding apparatus according to claim 1, wherein the valve assembly also selectively places the plasticizing unit in fluid communication with the injection cylinder.

7. The injection molding apparatus according to claim 3, wherein the valveassembly comprises a reciprocating rod extending coaxially through the piston of the injection cylinder.

8. An injection molding apparatus for injecting resin into a mold, the apparatus comprising:
    an injection cylinder in fluid communication with the mold, wherein movement of a piston within the cylinder injects a selected quantity of resin into the mold;
    a plasticizing unit including a flighted screw rotating in a containment barrel for plasticizing resin, the plasticizing unit in fluid communication with the injection cylinder for supplying the injection cylinder with plasticized resin; and
    a valve fluidly coupled between the injection cylinder, the plasticizing unit, and the mold, the valve for selectively placing the injection cylinder in fluid communication with the mold and for selectively exerting pressure on resin in the mold independent of the injection cylinder and the plasticizing unit.

9. The injection molding apparatus according to claim 8, wherein the valving means is actuated by relative movement between the mold and one of the injection cylinder and the plasticizing unit.

10. The injection molding apparatus according to claim 8, wherein the injection cylinder is coaxially aligned with the mold.

11. The injection molding apparatus according to claim 8, wherein the valve assembly selectively places the plasticizing unit in fluid communication with the injection cylinder.

12. The injection molding apparatus according to claim 10, wherein the valve comprises a reciprocating rod extending coaxially through the piston of the injection cylinder.

13. An injection molding apparatus for injecting resin into a mold, the apparatus comprising:
    an injection cylinder in fluid communication with the mold, wherein movement of a piston within the cylinder injects a selected quantity of resin into the mold;
    a plasticizing unit including a flighted screw rotating in a containment barrel for plasticizing resin, the plasticizing unit in selective fluid communication with the injection cylinder for supplying the injection cylinder with plasticized resin; and
    a valving assembly fluidly coupled between the injection cylinder, the plasticizing unit, and the mold, the valving assembly for selectively placing the injection cylinder in fluid communication with the mold and for selectively exerting pressure on resin in the mold independent of the injection cylinder and the plasticizing unit.

14. The injection molding apparatus according to claim 13, wherein the valving assembly includes a piston that is actuated by relative movement between the mold and one of the injection cylinder and the plasticizing unit.

15. The injection molding apparatus according to claim 13, wherein the injection cylinder is coaxially aligned with the mold.

16. The injection molding apparatus according to claim 13, wherein the plasticizing unit is coaxially aligned with the mold.

17. The injection molding apparatus according to claim 13, wherein the valving assembly selectively places the plasticizing unit in fluid communication with the injection cylinder.

* * * * *